United States Patent Office 3,634,546
Patented Jan. 11, 1972

3,634,546
CRYSTALLINE AND AMORPHOUS PROPYLENE
POLYMER ADHESIVE COMPOSITIONS
Hugh John Hagemeyer, Jr., and Raymond Lewis Etter,
Jr., Longview, Tex., assignors to Eastman Kodak Company, Rochester, N.Y.
No Drawing. Filed Apr. 5, 1967, Ser. No. 628,525
Int. Cl. C08f 29/12
U.S. Cl. 260—876 B
6 Claims

ABSTRACT OF THE DISCLOSURE

Blends of amorphous propylene polymers and about 1 to 30%, preferably 5 to 10% by weight of crystalline propylene homopolymer, or crystalline block copolymers of propylene having inherent viscosities of at least 1, or thermally degraded crystalline polypropylene, provides adhesive compositions having good cohesive strength together with excellent adhesive strength.

---

This application is directed to the preparation of adhesive compositions. More particularly, the present invention is directed to adhesive compositions composed of blends of amorphous polypropylene or amorphous block copolymers of propylene and α-olefins and particular crystalline propylene polymers.

Amorphous polypropylene and amorphous block copolymers of amorphous block copolymers of propylene and dissimilar, α-olefins are known to have excellent adhesive properties, adhesion being the ability to stick to another surface. These amorphous polymers, however, have relatively poor cohesive strength, cohesion being the state in which particles of the adhesive itself are held together. It has now been found that the blending of minor amounts of other crystalline polymers ot these amorphous polymers significantly increases the cohesive strength of the amorphous polymers without detracting from their adhesive strength. Thus, the polymer blend of the invention provide compositions having utility as excellent adhesives and laminants.

The amorphous propylene polymers of the invention are solid, rubbery homopolymers or block copolymers of propylene and α-olefins which are completely soluble in hexane.

The amorphous polymers may be obtained by extraction with boiling hexane from crude polymerizates prepared in inert liquid diluents or liquid monomer by stereospecific catalysts. The crude propylene-α-olefin block copolymers can be formed by polymerizing a dissimilar, or lower α-olefin, of 2 or 4 carbon atoms such as ethylene or 1-butene, onto the end of a preformed amorphous polypropylene chain, the α-olefin being introduced in the second stage in such a manner as to enter the chain at this point. The amorphous block copolymers of the invention contain at least 70%, preferably about 80 to 98% by weight polymerized propylene. The crude propylene homopolymer is formed, of course, by the polymerization of propylene alone.

In general, the substantially amorphous propylene polymers of the invention vary in viscosity from about 5,000 to 300,000 cps. at 150° C. with the preferred viscosity being in the range of about 20,000 to 200,000. The inherent viscosity (I.V.) measured in tetralin at 145° C. at 0.25% concentration, of the amorphous polymers usually falls in the range of about 0.2 to 0.6, preferably about 0.3 to 0.5 and the density is at least about 0.84 often up to about 0.86.

The solid stereospecific polymerization catalysts employed in polymerization reactions for the preparation of the amorphous propylene polymers generally contain at least two components, i.e., a transition element halide in combination with an activator therefor. These catalysts include, for example, mixtures containing a halide of a transition element from the 4th to the 6th subgroups of the Periodic Table in combination with a metal of Group I-A or II or aluminum, or with an alloy of metals of Group I-A and/or II and/or aluminum, or organometallic compound of a metal of Group I-A or II and/or aluminum, or with a complex hydride or a complex organometallic compound of boron or aluminum and a metal of Group I-A or II of the Periodic Table. The Periodic Table referred to herein can be found in "Lange's Handbook of Chemistry," 8th edition (1952), published by Handbook Publishers, Inc. at pages 56 and 57, for examples.

The transition metals included in Groups IV-B, V-B and VI-B of the Periodic Table are exemplified by metals such as titanium, zirconium, vanadium, molybdenum, chromium and the like. The transition metal halide catalyst components can be used at their maximum valence, which is preferred, or if desired, a reduced valency form of the halide can be employed. It is preferred to use the titanium chlorides which can be in the form of titanium tetrachloride, titanium trichloride and titanium dichloride. Examples of other transition metal halides that can be employed in the process of this invention include titanium tetrabromide, titanium tribromide, zirconium tetrachloride, zirconium tetrabromide, vanadium trichloride, molybdenum pentachloride, chromium trichloride and the like.

Suitable activators which can be employed in conjunction with the transition element halides include, for example, metal alkyls, metal alkyl halides and metal hydrides of aluminum or Group I-A and II as well as the metals above. The preferred activator is a lithium compound as exemplified by lithium metal, lithium alkyl, lithium aluminum hydride, lithium dialuminum heptahydride, lithium aluminum alkyls, lithium borohydride and lithium-aluminum compounds having the formula:

$$\text{LiAlH}_x\text{R}_y$$

wherein $x$ and $y$ are integers from 0 to 4, the sum of $x$ and $y$ is 4 and R is a hydrocarbon radical. Suitable Group I-A or II metals include sodium, potassium, lithium, zinc and the like. The alloys, halides, hydrides or organometallic compounds of these metals include, for example, sodium amyl, potassium butyl, lithium propyl, zinc dibutyl, zinc diamyl, zinc dipropyl, ethyl magnesium bromide, sodium hydride, calcium hydride, lithium aluminum hydride and the like. Also, the catalyst composition can contain an organo aluminum compound such as aluminum triethyl, aluminum tributyl, ethyl aluminum dichloride, cyclohexyl aluminum dichloride, cyclobutyl aluminum dichloride, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride and the like. A third component can also be employed to increase the stereospecificity of the catalyst. However, in some cases this may be undesirable in that it will substantially reduce, or even eliminate the yield of hexane-soluble polymer. Suitable third components include the halides of alkali metals, magnesium oxide, aromatic ethers, hydrides of sodium, potassium and lithium and alcoholates of sodium, potassium, lithium, calcium, magnesium, barium strontium, aluminum, titanium and zirconium. In addition, it is often desirable to employ tertiary amines and tertiary phosphoramides.

Generally mole ratios of activator to metal halide of 0.1:1 to 12:1 are satisfactory for the polymerization. Where a third component is employed, the mole ratio of metal halide to third component is generally about 0.25 to 1.0. The concentration of the catalyst in the reaction medium can be varied over a wide range. For example, catalyst concentrations of 0.1% or less, up to 3% or more can be used.

The temperature of the polymerization process can be widely varied. However, temperatures ranging from about 0° C. to about 300° C. are generally employed. With activators other than lithium and lithium compounds it is desirable to use temperatures less than 100° C. Suitable pressures for the polymerization process are from atmospheric to pressures of about 2,000 atmospheres or more. Generally, it is desirable to use pressures in excess of 15 atmospheres in order to obtain satisfactory rates of reaction.

Amorphous propylene homopolymers and amorphous propylene α-olefin block copolymers are recovered from their respective reaction systems by removing the catalyst and inert diluent. The gross propylene homo or block copolymers contain predominant amounts of hexane insolubles and minor amounts of polymer which is completely soluble in boiling hexane. It is the hexane soluble polymers that are used in the practice of this invention. The structure of the hexane-soluble propylene homo and block copolymers can be shown by any suitable means, for example, infrared analysis.

The crystalline polymers blended with the amorphous polymers of the invention are solid, hexane-insoluble, crystalline polymers selected from homopolymers of propylene, block copolymers of propylene and α-olefins of 2 or 4 carbon atoms and thermally degraded crystalline polypropylene. The crystalline propylene homopolymers and block copolymers of the invention are characterized by an inherent viscosity of at least 1, preferably at least 1.3, often up to about 3.0, measured in tetralin at 145° C. and a density of at least 0.90, usually up to about 0.92 (ASTM-D1505). The suitable thermally degraded crystalline polypropylenes have inherent viscosities of at least 0.2, usually up to about 1.0 or more.

The crystalline propylene homopolymers and crystalline block copolymers may be obtained by direct polymerization to an inherent viscosity of at least 1, utilizing a solid stereospecific catalyst and polymerization conditions selected to provide a crude polymerizate composed of at least 70% crystalline polymer. It should be noted that crystalline polypropylene formed as a by-product in polymerizations wherein the resulting crude polymerizate contains at least 70% amorphous propylene, for example, have been found unsuitable for use as the crystalline polymer component of the invention.

Illustrative of stereospecific catalysts which can be used to produce the crystalline propylene polymers are mixtures of trialkyl aluminum and halides of transition metals of reduced valency such as titanium trichloride and vanadium trichloride. If desired, a third catalyst component such as disclosed in the catalysts described above in the discussion of the amorphous propylene polymers of the invention may also be utilized as many other types of promoters such as are disclosed in U.S. Patent Nos. 2,956,991 and 3,149,097. The polymerization is generally carried out in the liquid phase at a temperature range of from 0° to 250° C., preferably 50° to 150° C. and a pressure ranging from atmospheric to 20,000 p.s.i., preferably about 30 to 1,000 p.s.i. The catalyst concentration is generally about 0.1% to 2% by weight of the inert organic liquid vehicle and the molar ratio of aluminum compared to transition metal halide is varied from 1:05 to 1.2, while the molar ratio of halide to third component if present is about 1:1 to 1:0.1. Illustrative and more detailed descriptions of polymerization processes that produce the crystalline polypropylene of the invention can be found in the aforementioned U.S. Patents 2,956,991 and 3,149,097 hereby incorporated by reference.

The crystalline block copolymers of propylene and lower α-olefin of the invention are often called crystalline polyallomers and comprise two separate and distinct crystalline segments, i.e. a body segment and a tail segment. The crystalline polyallomers found especially useful as those containing segments of polypropylene and polyethylene or segments of polypropylene and poly-1-butene. These polyallomers are made by initially polymerizing propylene and then polymerizing a different alpha-mono-olefinic hydrocarbon such as ethylene or butene-1 in the presence of the polymerized propylene until a polymer containing at least 80 percent by weight of polymerized propylene and at least 0.1% by weight of the polymerized alpha-mono-olefinic hydrocarbon forms. The polymerization is carried out at a temperature in the range of about 0 to about 300° C. and a pressure from about 1 to about 2,000 atmospheres in the presence of a solid stereospecific polymerization catalyst, one component of which being a halide of a transition metal from Group IV-B to Group VI-B of the Periodic Table and the second component being selected from the following: (a) aluminium, (b) a metal from Group I-A to Group II of the Periodic Table, (c) alloys, halides, complex hydrides and organo derivatives of aluminum or a metal from Group I-A to Group II of the Periodic Table and either aluminum and boron.

The thermally degraded crystalline polypropylene is obtained by the thermal degradation of high molecular weight crystalline polypropylene. The thermal degradation, for example, may be carried out according to the process of U.S. Patent No. 2,835,659 which essentially comprises heating at a temperature of 300 to 450° C., crystalline polypropylene having a density of at least 0.90 and an average molecular weight of at least 20,000 until the molecular weight is reduced to the desired value, generally about 1,000–8,000.

The amount of crystalline polymer blended with the amorphous polymer of the invention will fall in the range of about 1 to 50% by weight, preferably about 5 to 10% by weight. The actual amount o fthe crystalline polymer added in any given case will be dependent upon the particular polymer components selected but in all cases the amount is that sufficient to provide a composition of improved cohesive and adhesive properties.

The blending of the polymers may be effected by simply thoroughly mixing the polymers using any of the well known blending techniques and mixing equipment of the blending art. Exemplary of suitable mixing equipment are mill rolls, Banbury mixers, sigma blade mixers and the like. Blends may also be made by pumping each of the polymers in molten form by extruder or gear pump into a heated stirred tank and then into silicone-lined boxes or drums.

The adhesive compositions of the invention may be coated by any convenient means onto the surface of a suitable substrate as, for instance, cellulosic materials such as paper, paper board, wood, cellophane, and the like; metal sheets and foils, fiber glass, rubber, plastic films and sheets such as those served from polyethylene, polyvinyl chloride, polystyrene and the like. The compositions are particularly adapted to paper-paper laminations by hot melt coating; paper-foil (aluminum and other metal foil) laminations by hot melt coating; foil-foil laminations by hot melt coating; and paper and foil coatings for subsequent heat sealing. These latter operations are used in the preparation of articles such as paper board boxes, laminated multibags for fertilizer and feed, paper-foil laminations for packaging items such as soap cakes and paper-foil laminated cans.

The invention can be further illustrated by the following examples of preferred embodiments. However, it will be understood that these examples are included merely for purposes of illustration and are intended to limit the scope of the invention. The percentages employed in the examples are by weight.

EXAMPLE 1

A blend of 95% amorphous polypropylene having a viscosity of 5550 cp. at 190° C. and 5% crystalline polypropylene having an inherent viscosity in tetralin at 145° C. of 1.6 and a flow rate at 230° C. of 4.5 is prepared in a heated sigma blade mixer. The resulting blend is coated onto 40 pound kraft paper using a Tidland hot melt roll coater to a thickness of 1 mil. Portions of this coated paper are heat-sealed to 40 pound kraft paper and to uncoated aluminum foil at 300° F., 30 p.s.i. clamp pressure and ½-second dwell time. A control consisting of one hundred percent of the same amorphous polypropylene is coated and tested in the same manner. The strength of the bond was measured in each case by clamping a 1-inch wide strip of the laminated or heat-sealed material in the jaws of an Instrom tensile machine and measuring the force required to separate the bond. This result was recorded in grams per inch of width. The type of tear was also noted and recorded as follows:

Polymer tear—Polymer yielded first
Paper tear—Fibers of paper yielded first at recorded force
Foil tear—Foil particles tore at recorded force
Foil pucker—Foil deformation resulted at recorded force The results are tabulated below:

|  | 100% amorphous polypropylene control | Amorphous polypropylene plus 5% crystalline polypropylene |
|---|---|---|
| Paper-paper seal: | | |
| Adhesion, g./in | 60 | 490. |
| Type tear | Polymer tear | Paper tear. |
| Foil-paper seal: | | |
| Adhesion | 430 | 753. |
| Type tear | Foil pucker | Foil pucker. |

EXAMPLES II AND III

Example I is repeated and blends were prepared using 10% and 20% respectively, of a crystalline polypropylene having an inherent viscosity in tetralin at 145° C. of 1.6 and a flow rate of 4.5 at 230° C. Results on seal testing were as follows:

|  | 100% amorphous polypropylene control | Amorphous PP plus 10% crystalline PP | Amorphous PP plus 20% crystalline PP |
|---|---|---|---|
| Paper-paper seal: | | | |
| Adhesion, g./in | 60 | 430 | 480. |
| Type tear | Polymer tear | Paper tear | Paper tear. |

EXAMPLES IV, V AND VI

Example I is repeated using blends containing 5, 10, and 20 percent thermally degraded crystalline polypropylene having a melt viscosity at 190° C. of 4500 cp. The results on seal testing are listed below:

|  | 100% amorphous polypropylene control | Amorphous polypropylene plus 5% thermally degraded PP | Amorphous polypropylene plus 10% thermally degraded PP | Amorphous polypropylene plus 20% thermally degraded PP |
|---|---|---|---|---|
| Paper-paper seal: | | | | |
| Adhesion, g./in | 60 | 280 | 395 | 510. |
| Type tear | Polymer | Polymer | Paper | Paper. |
| Foil-paper seal: | | | | |
| Adhesion, g./in | 430 | 440 | 390 | 330. |
| Type tear | Foil pucker | Foil pucker | Foil pucker | Foil pucker. |

EXAMPLES VII, VIII AND IX

Amorphous block copolymer of propylene and ethylene having a viscosity at 190° C. of 7200 cp. and an ethylene content of 17.6 is blended with about 5, 10 and 20%, respectively, of a crystalline block copolymer of propylene and ethylene having an ethylene content of 1.6%, and inherent viscosity in tetralin at 145° C. of 1.9 and a flow rate of 2.1 at 230° F.

Each of the blends is coated onto 40 pound kraft paper and aluminum foil and these coated materials are heat sealed at 300° F., 30 p.s.i., and ½ sec. to paper and foil. The adhesion strength is measured as in Example I and the results are tabulated as follows:

|  | Amorphous block copolymer control | Amorphous block copolymer with percentage of crystalline block copolymer | | |
|---|---|---|---|---|
|  |  | plus 5% | plus 10% | plus 20% |
| Paper-paper seal: | | | | |
| Adhesion, g./in | 105 | 520 | 740 | 780. |
| Type tear | Poly | Paper | Paper | Paper. |
| Paper-foil seal: | | | | |
| Adhesion, g./in | 380 | 560 | 600 | 590. |
| Type tear | Poly | Foil pucker | Foil pucker | Foil pucker. |
| Foil-foil seal: | | | | |
| Adhesion, g./in | 410 | 605 | 620 | 610. |
| Type tear | Poly and foil pucker. | Foil tear. | Foil pucker aad tear. | Foil tear. |

Although the invention has been described in considerable detail with reference to certain preferred embodiments thereof, it will be understood that variations and modifications can be effected without departing from the spirit and scope of the invention as described hereinabove and as defined in the appended claims.

We claim:
1. An adhesive composition consisting essentially of about 80 to 99% by weight of a polymer selected from the group consisting of solid, hexane-soluble amorphous homopolymers of propylene and solid, hexane-soluble amorphous block copolymers of propylene and ethylene or butene-1 and about 1 to 20% by weight of a solid, hexane-insoluble crystalline polymer selected from the group consisting of thermally degraded crystalline polypropylene, crystalline homopolymers of propylene and crystalline block copolymers of propylene and ethylene and butene-1, said crystalline homopolymers and block copolymers having an inherent viscosity in tetralin at 145° C. of at least 1.

2. The composition of claim 1 wherein the amount of crystalline polymer is about 5 to 10% by weight.

3. The composition of claim 2 wherein the crystalline polymer selected is the hexane-insoluble propylene homopolymer.

4. The composition of claim 2 wherein the crystalline polymer selected is the hexane-insoluble block copolymer of propylene and an α-olefin of 2 or 4 carbon atoms.

5. A substrate coated with the composition of claim 1.
6. A substrate coated with the composition of claim 2.

References Cited

UNITED STATES PATENTS 3,341,626  9/1967  Peterkin _____ 260—897

MURRAY TILLMAN, Primary Examiner

C. J. SECCURD, Assistant Examiner

U.S. Cl. X.R.

117—132 C, 138.8 E, 138.8 UA, 148, 155 UA; 156—334; 161—216, 250; 260—897 A.